United States Patent [19]

Hazebrouck

[11] Patent Number: 4,703,377
[45] Date of Patent: Oct. 27, 1987

[54] THERMAL COMPENSATION FOR DISK DRIVE CARRIAGE ASSEMBLY

[75] Inventor: Henry B. Hazebrouck, Sunnyvale, Calif.

[73] Assignee: Priam (Delaware) Corporation, San Jose, Calif.

[21] Appl. No.: 826,689

[22] Filed: Feb. 6, 1986

[51] Int. Cl.⁴ .............................................. G11B 5/55
[52] U.S. Cl. ................................................... 360/106
[58] Field of Search ............... 360/104, 105, 106, 109, 360/101

[56] References Cited

U.S. PATENT DOCUMENTS 4,549,239 10/1985 Kawaijiri ............................ 360/105

FOREIGN PATENT DOCUMENTS 0137987 10/1979 Fed. Rep. of Germany ...... 360/106
3202577 8/1982 German Democratic
  Rep. ..................................... 360/106
0011912 1/1977 Japan .................................. 360/106
0163012 12/1979 Japan .................................. 360/106

Primary Examiner—Robert S. Tupper
Assistant Examiner—Andrew L. Sniezek
Attorney, Agent, or Firm—Flehr, Hohbach, Test, Albritton & Herbert

[57] ABSTRACT

In the carriage assembly of a disk drive, thermally compensating elements are positioned between the support structure for the carriage and a fixed guide plate which is associated with an outrigger bearing of the carriage. Compensation is achieved for expansion of the carriage base and displacement of the fixed guide plate and the outrigger bearing which results from thermal change, thereby precluding roll of the carriage.

11 Claims, 7 Drawing Figures

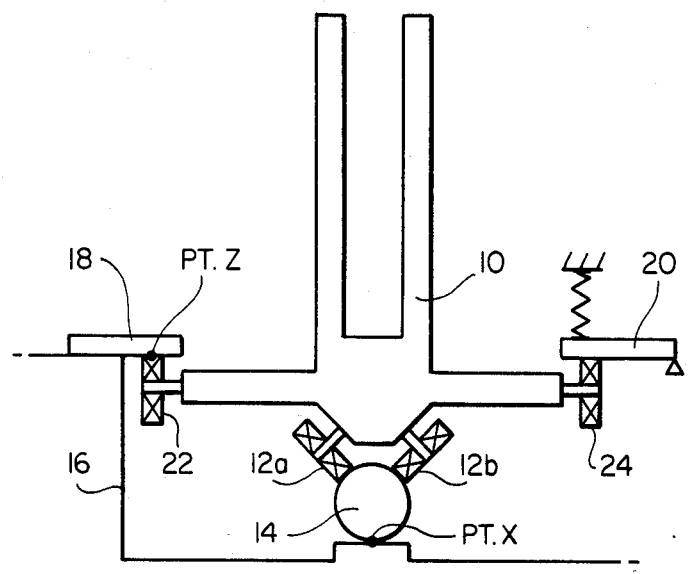
FIG_1
(PRIOR ART)
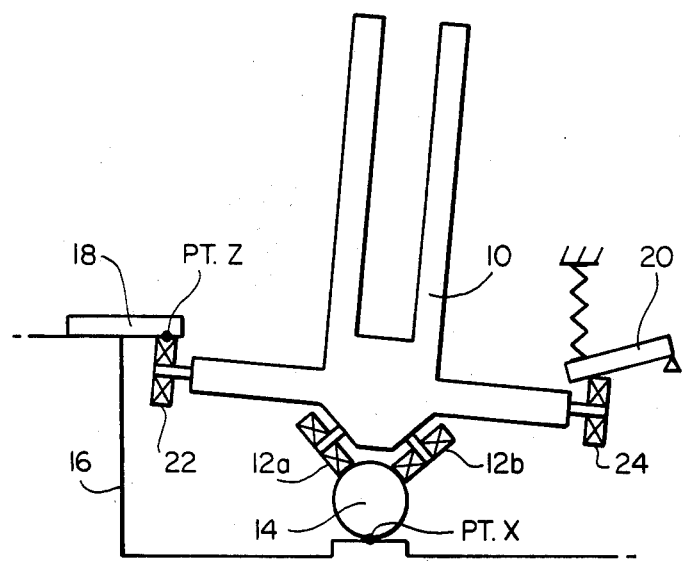
FIG_2
(PRIOR ART)

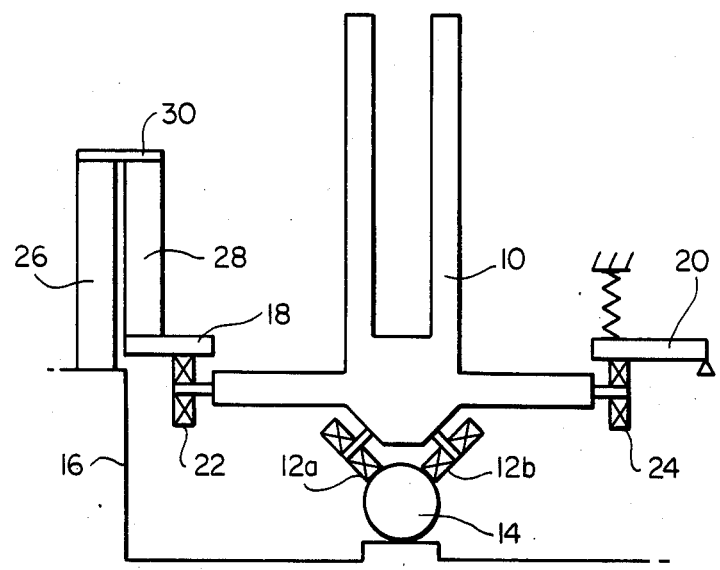
FIG_3
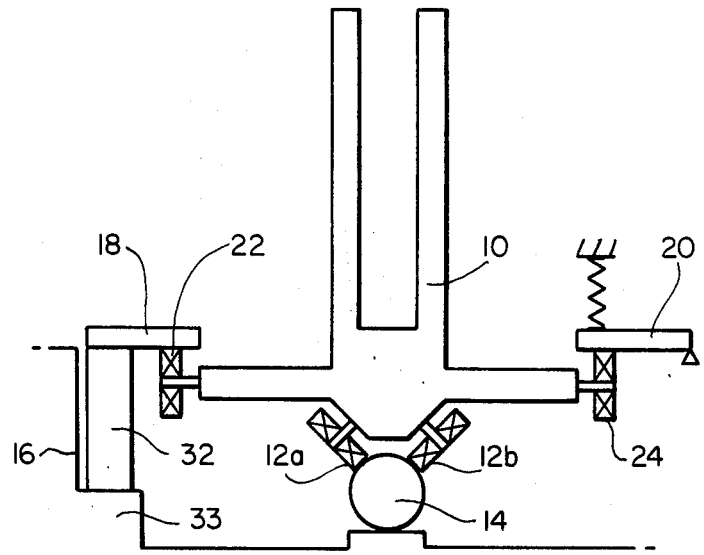
FIG_4

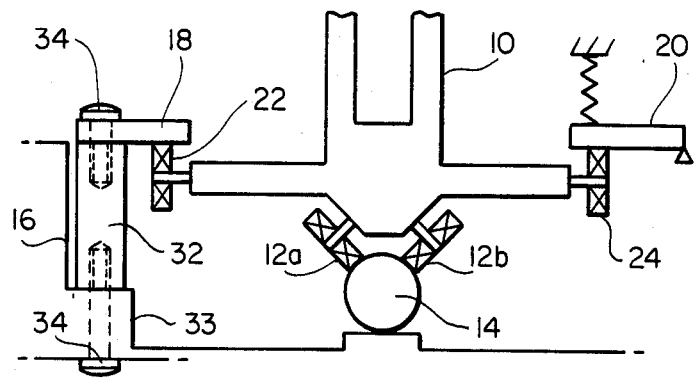
FIG_5
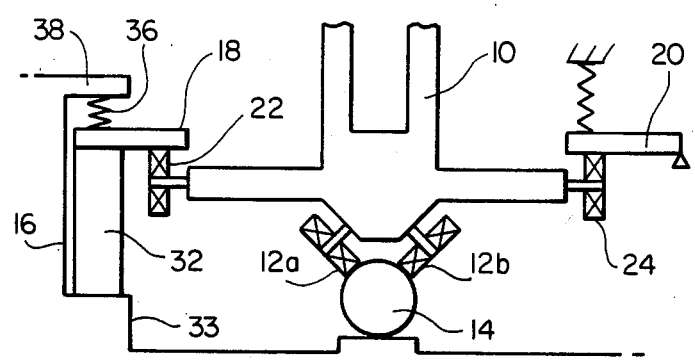
FIG_6
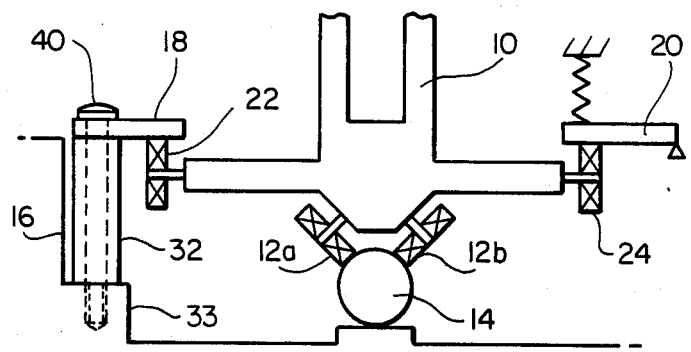
FIG_7

THERMAL COMPENSATION FOR DISK DRIVE CARRIAGE ASSEMBLY

DESCRIPTION

1. Technical Field

This invention relates to an improved disk drive and in particular to a disk drive having compensating means for temperature changes.

2. Background of the Invention

A significant problem that exists with disk drives is off-track operation of the magnetic transducers or heads. One factor that contributes to off-track operation is a change in temperature which affects the disk drive parts. Since the parts are made of different materials, such as aluminum and stainless steel which have different thermal coefficients of expansion, temperature changes cause an undesirable expansion or compression of critical parts that need to maintain the same relative geometrical relationship during the write and read modes. If such relationship between the parts is changed, the carriage assembly and the linear actuator will roll so that the magnetic transuacers or heads are oriented differently with relation to the data tracks of a rotating magnetic disk. In such case previously recorded data would be read incorrectly or not read at all. The roll effect becomes more pronounced when a plurality of heads are staggered relative to the track path so that additional disks may be incorporated into the disk drive.

SUMMARY OF THE INVENTION

In accordance with this invention, a disk drive includes thermally compensating elements that are interposed between the support structure for the carriage and a fixed guide plate associated with an outrigger bearing of the carriage. Change in the dimensions of the carriage assembly parts, particularly the base, the fixed guide plate and the associated bearing, that results from thermal variation, is effectively compenstated thereby reducing carriage roll and off-track operation of the read/write magnetic heads.

BRIEF DESCRIPTION OF THE DRAWINGS

The invention will be described in greater detail with reference to the drawings in which:

FIG. 1 is a schematic rear view representation of a conventional carriage assembly used with a disk drive;

FIG. 2 is a schematic rear view representation of a conventional carriage assembly, such as illustrated in FIG. 1, showing the effects of differential expansion resulting from temperature change;

FIG. 3 is a schematic rear view of a carriage assembly incorporating thermal compensation means to prevent carriage roll, in accordance with this invention;

FIGS. 4-7 respectively are schematic rear view representations of alternate arrangements of thermal compensating means useful for a disk drive assembly.

Similar numerals refer to similar elements throughout the drawing.

DISCLOSURE OF THE INVENTION

With reference to FIG. 1, a prior art carriage assembly is illustrated which includes a carriage 10 that supports head arms and magnetic transducers for bidirectional accessing of rotating magnetic disks. The carriage 10 is coupled to front and rear pairs of roller bearings, only the rear bearings 12a, 12b being shown in this illustration. The front and rear roller bearings 12a, 12b are angled to ride on a central longitudinal rod or rail 14, made of stainless steel for example, which defines the direction of bidirectional travel of the carriage. The rail 14 is fixedly positioned on a base 16, which is preferably made of aluminum. A fixed guide plate 18 is located to one side of the carriage structure 10 in contact with an upper surface of the base. The fixed guide plate 18 bears against an outrigger bearing 22, which is connected to the carriage and travels along the guide plate 18 when the carriage is actuated. At the other side of the carriage structure, a spring-loaded guide plate 20 is urged against a second outrigger bearing 24 which travels along the guide plate 20 when the carriage is moved. The outrigger bearings 22 and 24 act to keep the carriage from rotating sideways.

FIG. 2 illustrates a condition of carriage roll which occurs with the prior art carriage assembly of FIG. 1 when an operating disk drive experiences a rise in temperature. The carriage roll results from the expansion of the base 16 in the vertical direction relative to a point X that is delineated at the contact point between the base and the rail 14. When the disk drive becomes heated during operation, the base expands and the mass at point Z on the guide plate 18 will move up and away relative to point X. A second vertical expansion path is defined from point X through the stainless steel rod or rail 14, bearings 12a, 12b, the carriage 10 and bearing 22 to point Z. This vertical expansion path includes parts made mostly from steel and stainless steel. As a result of the differences in the thermal coefficients of expansion of steel and aluminum, from which the different parts are made, the guide plate 18 is urged to lift upwards from the bearing 22. As the bearing 22 is forced against the displaced guide plate 18, the carriage rolls sideways while contact is maintained between the bearing 22 and the guide plate 18.

To overcome this problem of carriage roll and off-track transducing, thermal compensating elements are incorporated in the disk drive assembly in accordance with this invention. In one implementation of the invention as depicted in FIG. 3, the fixed guide plate 18 is attached to the base 16 through an assembly consisting of a stainless steel element and an aluminum element 28. The stainless steel element 26 is seated on the upper surface of the base 16 whereas the aluminum element 28 rests on the fixed guide plate 18. The steel and aluminum elements 26 and 28 are disposed in a substantially parallel configuration, and are tied for mechanical stability by a connecting part 30 which may be made of steel or aluminum or any substantially rigid material. With this arrangement, when the disk drive experiences temperature changes during operation, the aluminum element 28 expands downward more than the stainless steel element 26 expands upward. Since the thermal coefficients of expansion for the materials used are known, and as the change in temperature during disk drive operation is determinable, the amount of movement of the fixed guide plate 18 in the vertical direction can be computed, and the lengths of the stainless steel element 26 and of the aluminum element 28 necessary for proper thermal compensation can be calculated.

An alternative embodiment is depicted in FIG. 4, wherein a portion of the aluminum base 16 is machined and cut out to form a step 33 and a block 32 made from a material such as carbon steel, stainless steel, titanium or Invar (nickel-iron-alloy) replaces the material from the base that has been removed. The cutout in the base and thus the vertical height of the block 32 are made so that the vertical expansion of the fixed guide plate 18 is substantially the same as that of the outrigger bearing 22.

With reference to FIG. 5, the attachment of the block 32 is achieved in one implementation by using screws 34 which pass through holes in the guide plate 18 and the step portion 33 to engage threaded grooves formed in the block 32. An alternative approach to assembling the block 32 between the base step 33 and the fixed guide plate 18 is portrayed in FIG. 6, wherein a compression spring 36 is clamped between a protruding section 38 formed with the base and the guide plate 18. Another implementation of assembling the block 32 between the base 16 and the fixed guide plate 18 is illustrated in FIG. 7, wherein a threaded bolt 40 passes through a clearance hole in the fixed guide plate 18 and a slot in the compensating block 32 to engage a threaded step portion 40 of the base. The block 32 is preferably made to be stiff relative to the bolt 40. The thermal expansion coefficient of the block 32 is not influenced by the bolt 40 and provides the desired compensation which allows the orientation of the guide plates to be properly maintained so that carriage roll and off-track head operation are virtually eliminated.

What is claimed is:

1. A disk drive for recording and reading of data including a carriage assembly for transporting transducers bidirectionally relative to a record medium comprising:
    a carriage structure;
    a base for supporting said carriage structure;
    an outrigger bearing means fastened to the sides of said carriage structure;
    a fixed guide plate positioned at one side of said carriage for constraining the bearing means disposed at said one side;
    a spring-loaded guide plate located at an opposite side of said carriage structure for providing a load force to the bearing means disposed at said opposite side;
    at least one thermally compensating element positioned in thermal contact with said carriage structure and between said base and said fixed guide plate, whereby a temperature change affecting dimensions of said carriage structure are offset and temperature-induced roll of the carriage structure is reduced.

2. A disk drive as in claim 1, wherein said base is made of aluminum and said fixed guide plate is made of stainless steel.

3. A disk drive as in claim 1, including a step portion formed in said base, wherein said thermally compensating element comprises a block that is seated between said fixed guide plate and said step portion.

4. A disk drive as in claim 3, wherein said block is made of carbon steel, or stainless steel, or titanium, or Invar(nickel-iron alloy).

5. A disk drive as in claim 3, wherein said block is formed with a slot, and including a bolt fastened to said step portion, said bolt extending through an aperture in said fixed guide plate and said slot in said block.

6. A disk drive as in claim 3, wherein said base is formed with a protruding section, and including a compression spring fixed between said protruding section and said fixed guide plate.

7. A disk drive as in claim 3, including a plurality of screws for engaging said block with said fixed guide plate and the step portion of said base respectively.

8. A disk drive as in claim 1, wherein said at least one thermally compensating element comprises a stainless steel element seated on said base and an aluminum element seated on said fixed guide plate, including a connecting part for securing said stainless steel element and said aluminum element in spaced and substantially parallel relationship.

9. A disk drive as in claim 1, wherein said bearings are roller bearings.

10. A disk drive as in claim 1, including a central rail along which said carriage structure travels.

11. A disk drive as in claim 10, including angled roller bearings connected to said carriage structure for engaging said central rail.

* * * * *